United States Patent Office 3,282,707
Patented Nov. 1, 1966

3,282,707
TABLE SYRUP EMULSION AND METHOD OF
MAKING SAME
Harry H. Topalian and Charles C. Elsesser, Dover, Del.,
assignors to General Foods Corporation, White Plains,
N.Y., a corporation of Delaware
No Drawing. Filed Mar. 23, 1964, Ser. No. 354,125
14 Claims. (Cl. 99—142)

This invention relates to a pourable, oil-in-water emulsion specifically adapted for use as a table syrup and, more particularly, to such an emulsion with improved resistance to separation of the oil and aqueous phases thereof.

Stabilized oil- or fat-in-water emulsions have long been in commercial use in many arts, and particularly in the food industry, where such emulsions are marketed as salad dressings, sauces, candy creams and syrups. It has also long been recognized that an edible emulsifier and/or stabilizer is necessary in addition to the oil and water phases if those phases are to be blended into an emulsion which will not separate out for a reasonable period of time. Commonly used dispersants such as gelatin, caseinates and gum arabic have, therefore, been used with success in edible oil-in-water emulsions.

Recently, more sophisticated stabilizers-emulsifiers and viscosity agents have been used to advantage to disperse oil and water phases into an emulsion, particularly one which must be maintained at an acid pH level, so that the resulting emulsions will be stable over an extended period of time. As an example, in the booklet, "Algin at Work," published by Kelco Company of San Diego, California, various edible alginates are set forth as useful as stabilizers and emulsifiers in such food products as ice cream, cream cheese, fountain syrups, sherbets, frozen fruits, chocolate milk, icings, toppings, meringues and ice milk. In particular, algin derivatives which are marketed under the trademark "Kelcoloid" and which are propylene glycol alginates, are specified for use in foods such as syrups at acid pH's. Such agents act in an oil-in-water emulsion both to stabilize a dispersion of the oil and water phases and, optionally, to increase the viscosity of the emulsion.

Difficulties have arisen, however, when stabilizers-emulsifiers such as carrageenan and lecithin are utilized in combination as stabilizing and emulsifying agents in products such as table syrups, which must of necessity undergo prolonged storage in bottles or other containers prior to use by the consumer. Thus, separation of the oil and water phases has been noted when a table syrup employing an oil phase such as butter remains on the shelves of the retail outlet for several months. In many instances, there is at least partial separation of phases, which phases cannot be completely put into solution by the consumer by shaking the bottle. This separation constitutes an important disadvantage of buttered table syrups and has met with consumer dissatisfaction.

Particular difficulties have been encountered in maintaining the stability of an edible oil-in-water emulsion using carrageenan as a stabilizer during successive freeze-thaw cycles repeated freezing and thawing of the emulsion tending to result in separation of the oil and water phases. Such alternate freezing and thawing conditions might well be encountered in temperate climates during the winter as the emulsion is shipped in unheated vehicles and the temperature is above the freezing point of the emulsion during the day and below that point at night.

It is, therefore, a general object of the present invention to provide a stabilized oil-in-water emulsion suitable for use as table syrup, topping, or the like, which emulsion has improved stability against separation over prolonged periods of storage.

It is a specific object of this invention to provide an edible oil-in-water emulsion that exhibits marked resistance to separation of the oil and water phases under repeated freeze-thaw cycles.

The present invention is based on the discovery that gum ghatti, in physical combination with lecithin, will stabilize an emulsion of oil and water phases; it is particularly useful when the aqueous phase contains a quantity of sugar solids in excess of 65 percent of that phase, and thus is difficult to stabilize. Gum ghatti has not heretofore been used for any such purpose and exhibits characteristics as a stabilizer and, possibly, an emulsifier, which are not found in prior art emulsifiers utilized to form oil-in-water emulsions containing relatively high percentages of sugar solids.

The present invention takes the form of a stable, pourable oil-in-water emulsion, and a method for preparing that emulsion. Broadly, the aqueous phase of the emulsion will contain at least about 65 percent sugar solids. The oil phase contains an edible oil in an amount of about 1 to 40 percent by weight of emulsion. The lecithin utilized constitutes about .02 to .5 percent of the emulsion, while the gum ghatti makes up about .1 to 1.0 percent of the emulsion. These quantities of lecithin and gum ghatti are set forth when the lecithin is the sole emulsifier used to assist in the formation of an emulsion and gum ghatti is the sole stabilizer utilized to stabilize the emulsion. It will be apparent, of course, that when lecithin and gum ghatti are employed in combination with other emulsifiers and stabilizers, then the amounts of gum ghatti and lecithin may vary within the lower portions of the ranges stated and may even fall outside the quantities set forth as operative ranges.

In the method form of the invention, the process generally comprises blending an aqueous solution containing at least about 65 percent sugar, oil in an amount of about 1 to 40 percent by weight of the final emulsion, gum ghatti in an amount from about .1 to 1.0 percent of that emulsion, and lecithin in an amount from about 0.02 to .5 percent of the emulsion. The blended materials are then homogenized to form a stable emulsion. The quantities of various ingredients will likewise vary in accordance with whether other emulsifiers and/or stabilizers are used in conjunction with lecithin and gum ghatti. The present method, however, contemplates specific use in the preparation of an emulsion containing a relatively high percent of sugar solids, i.e., at least about 65 percent sugar solids in the aqueous phase.

Since it is primarily intended that the stable emulsion, which is an important part of the present invention, be adapted for food use, specically for use as a table syrup, the quantities of some of the ingredients therein will be subject to variations in accordance with the particular use to which the syrup is to be adapted and the grade and flavor of the product to be manufactured. Table syrup in its most preferred form is a cane-corn syrup blend in which, in the present invention, butter and maple syrup are incorporated; it will be apparent that the amount of butter in the syrup, as well as the amount of maple syrup will vary in accordance with consumer preference and the retail price at which the syrup is to be marketed. In addition, if the syrup is to be utilized to pour over ice cream and for general fountain use, as well as a topping for pancakes, waffles and the like, it may be desirable to increase the sugar solids content of the aqueous phase of the emulsion well beyond 65 percent up to about 80 percent or more, providing the syrup or topping is still pourable.

Consequently, while in its most preferred form the syrup is contemplated as having about 2 percent butter or other oil by weight of the emulsion, the amount of oil will vary from a preferred range of about 1 to 5 percent to a broad range of about 1 to 40 percent. In addition, where maple syrup is used as a flavoring ingredient, the most preferred amount of such maple syrup used is presently about 2 percent by weight of the finished emulsion. It will, of course, be apparent that a more expensive product would incorporate greater amounts of maple syrup, which is relatively expensive compared to a cane-corn syrup blend. While, as stated, the percentage of sugar solids in the aqueous phase will generally be at least about 65 percent, increased viscosity requirements will result in increased sugar content. The sugar content should not be so high that crystallization will occur at conventional storage temperatures or that the syrup will become nonpourable and must be spooned from its container.

The stabilizer utilized in the present composition of matter and method is gum ghatti, also known as Indian gum. It is an exudate from the stems of *Anogeissus latifolia*, a large tree widely distributed in India and Ceylon. The gum has been determined to be an inorganic salt, primarily the calcium salt, of a polysaccharide acid, ghattic acid. It is soluble in water at room temperature to about 90 percent or more, the soluble portion having a molecular weight of 11,860 as determined by osmotic pressure measurements. Gum ghatti has been stated by Professors Smith and Montgomery in "The Chemistry of Plant Gums and Mucilages," Rheinhold Publishing Corporation, New York, New York (1959), to resemble damson gum and cherry gum from the standpoint of component sugars and contains a high proportion of terminal L-arabofuranose units, but appears to differ from such gums in possessing a 1→6-linked galactose framework. The gum appears to be unique in its structure, and in stabilizing an oil-in-sugar syrup emulsion such as that which is part of the present invention, acts in a manner which is not characteristic of other gums and which is highly advantageous in establishing its use as a stabilizing agent.

The amount of gum ghatti which should be present in the emulsion in order to satisfactorily stabilize it will vary in accordance with the amount of oil in the finshed emulson. Broadly, the amount of gum ghatti will vary from about 0.1 to 1.0 percent, more preferably 0.3 to 0.5 percent of the emulsion. The optimum amount of gum ghatti has been found to be about 0.4 percent of an emulsion that has about 2 percent of butter therein.

Among the oils which can be used to form the present emulsion, in addition to butter or butter oil, are triglycerides such as corn oil, cotton seed oil, palm kernel oil and coconut oil. If the emulsion is to be used as table syrup, it will be apparent that since table syrups are normally translucent, the refractive indices of the water and oil phases may be approximately matched in order to avoid opacity in the table syrup and possible consumer resistance. In a salad dressing formed in accordance with the present invention, opacity would not be as undesirable as in a table syrup.

The term "lecithin" as used herein and in the appended claims is intended to refer to phosphatide compositions derived from materials such as soy beans, corn, cotton seed, peanuts, egg yolks, liver and the like, which contain lecithin in varying degrees of purity. The lecithin can be a natural product derived from these sources, and may also be formed from phosphatides modified by various processes, such as hydroxylation and phosphorylation. The most preferred form of lecithin as a vegetable phosphatide which, in addition to the phosphatidic material, has an oleaginous carrier such as soy bean oil or cocoa butter. It is, of course, necessary that the lecithin be highly water-dispersible and have some emulsification power for the fat phase of the system. Complete and partial hydroxylation of the phosphatides may be carried out in accordance with the method described in U.S. Patent No. 2,445,948 to Wittcoff.

The quantity of lecithin which has been found operable in an oil-and-water emulsion according to the present invention, is, broadly, about 0.02 to 0.5 percent of the finished emulsion. Preferably, the amount of lecithin will very between 0.06 to 0.09 percent of the emulsion; most preferably, the lecithin will constitute about 0.08 percent of the emulsion. Since the lecithin is used as an emulsifying agent, it will be apparent that the quantity of oil to be dispersed in the aqueous phase will, to an extent, be determinative of the amount of lecithin required and that, therefore, the maximum amount of lecithin necessary could exceed the broad limit stated. Of course, the amount of lecithin used cannot be such as to impart an off-flavor to the emulsion when it is to be used as a table syrup or for other edible purposes.

It has been found advantageous to incorporate in the emulsion an edible acid, such as citric acid, tartaric acid, adipic acid or fumaric acid. A buffer salt of an acid is usually present in order to maintain the acidity of the final product within desired limits. Preferred ranges of acidity are between pH's of about 4.5 to 5.5, most preferably between about 4.9 to 5.1. A pH on the acid side has been found advantageous in improving the flavor of the emulsion when it is used as a syrup or topping. Also, it will be economically desirable to have the pH at that range at which the gum ghatti is most soluble.

According to the method of the present invention, a blend of materials, including sugar syrup, edible oil, lecithin and gum ghatti in a requisite amount is made and the blend homogenized to a stable emulsion. A preferred method is to utilize sugar syrup to solubilize the gum ghatti in the aqueous phase and then separately add to that phase butter, lecithin and maple flavor if desired. For example, gum ghatti can be added to cane syrup and put into solution therein, then blended with a basic syrup that consists of a cane-corn syrup blend plus maple syrup, citric acid, sodium citrate and sodium benzoate. After this blend has been formed, the oil phase including butter and lecithin are added and the whole blended to a dispersion. Homogenization can then take place.

The temperature at which the process of this invention is carried out will generally vary from about 140° to 200° F. Thus the butter-sugar syrup solution should be within that temperature range, most preferably at a temperature of about 170° F. By maintaining the temperatures of the various materials, a temperature of about 170° F. can be provided throughout the blending of the various syrups, and homogenization can also take place at a temperature of about 170° F., although such homogenization temperatures can vary from about 140° to 180° F.

Homogenization pressures should be sufficient to form a relatively stable emulsion of the blended ingredients. Preferably, homogenization has been found most desirable when the first stage of homogenization takes place at a higher pressure than the second stage. Exemplarily, the first stage may be at a pressure of 4000 p.s.i.g. and the second stage at a pressure of 500 p.s.i.g. Alternatively, first and second stage pressures of 2500 and 1000 p.s.i.g. might be maintained. In any event, homogenization should be carried out until the particle size of the oil globules is reduced to a point where the globules, which may be assumed to be round, have a diameter less than 3 microns. It is even more desirable if the diameters of the oil globules are reduced to less than 2 microns, and still better if they are less than 1 micron. Should it be desired to adjust the transparency or opacity of the emulsion, this can easily be accomplished by the well-known method of adjusting the refractive indices of the oil and water phases. In the absence of other optical phenomena, an emulsion will be transparent when the refractive indices of the oil and water phases thereof are matched.

The present invention will be better understood by reference to the following specific examples of a method for preparing a table syrup and the syrup so prepared in accordance with our invention.

Example I

Gum ghatti was added to cane syrup at 200° F. with the aid of a Venturi and held for 60 minutes at 170° F. with constant agitation. The cane syrup had a sugar solids content of 67° Brix and was in a quantity sufficient to constitute 60 percent of the finished product. The gum ghatti was added in an amount equal to 0.40 percent of the finished product. Another syrup was separately formed by mixing and blending for 5 minutes a cane syrup-corn syrup blend, maple syrup, citric acid and sodium citrate. The cane-corn syrup blend was at 73° Brix and amounted to about 33 percent of the finished product. The amounts of maple syrup, citric acid and sodium citrate constituted 2.0, .02 and .06 percent by weight of the finished product. The two syrups were then blended together and the sugar solids adjusted to 67° Brix by the addition of water. This resulting syrup constituted the aqueous phase of the finished product and was held at a temperature of 170° F. Two percent butter and .08 percent lecithin were then added to the aqueous phase and the oil and aqueous phases blended for 5 minutes at a temperature of 170° F. The blended syrup was then passed into a Manton-Gaulin homogenizer at 170° F. with a first stage pressure of 4000 p.s.i.g. and a second stage pressure of 500 p.s.i.g. The diameter of each oil globule, by which is meant the oil droplet, its immediately surrounding and adhering aqueous phase, and the interface zone between the droplet and its aqueous phase, was less than 2 microns. The buttered syrup so produced was then bottled and capped.

Example II

The buttered syrup prepared in accordance with Example I had the following formula:

| Ingredients: | Percent by weight |
|---|---|
| Cane syrup (67° Brix) | 60.0 |
| Cane syrup-corn syrup blend (67° Brix) | 33.0 |
| Butter | 2.0 |
| Maple syrup | 2.0 |
| Gum ghatti | 0.40 |
| Lecithin | 0.08 |
| Trisodium citrate | 0.06 |
| Citric acid | 0.02 |
| Water | 2.44 |

The pH of the buttered syrup was approximately 5.1.

An oil-in-water emulsion, such as the buttered syrup whose preparation and formula has been exemplarily set forth in Examples I and II hereinbefore, has a major advantage over similar oil-in-water emulsions which have been stabilized with most gums other than gum ghatti, in combination with lecithin. For example, pilot plant samples of the buttered syrup described in Example II remained substantially unchanged after 12 weeks of once-a-week cycling between 0° F. and room temperature. During such cycling there was no evidence of emulsion instability such as appeared with similar samples utilizing carrageenan in lieu of gum ghatti as the stabilizer. Emulsion instability generally appears as a slight separation ring around the neck of the bottle. Samples of a buttered syrup in accordance with Example II were exposed to extended periods of storage at 140° F. and likewise remained unchanged. Periodic microscopic analyses of the emulsion showed no significant change in the size of the fat globules, which range from 1 to 3 microns in size. After the 12 week cycling test between 0° F. and room temperatures (about 70° F.), the viscosity of the finished product remained constant, thus indicating lack of further degradation of the gum ghatti. This improvement in the resistance of gum ghatti-stabilized buttered syrup to temperature changes was unexpected from a prior examination of the literature with respect to gums as stabilizers and emulsifiers.

It will be apparent that modification and alterations in the emulsion and process for preparing same disclosed and exemplified hereinbefore will prove obvious to those skilled in this art without departing from the scope of the present invention. All such modifications and alterations are deemed to be included within the purview of this invention, which is to be limited only by the scope of the following, appended claims.

What is claimed is:

1. An edible, stable, pourable oil-in-water emulsion suitable for use as a table syrup, comprising an aqueous phase containing at least about 65 percent sugar solids, an oil phase containing edible oil in an amount of about 1 to 40 percent by weight of said emulsion, lecithin in an amount of about .02 to .5 percent of said emulsion, and gum ghatti in an amount of about .1 to 1.0 percent of said emulsion.

2. An oil-in-water emulsion as claimed in claim 1, in which said lecithin is present in an amount of from 0.5 to 50 percent of said edible oil.

3. An oil-in-water emulsion as claimed in claim 1, in which said edible oil is butter.

4. An oil-in-water emulsion as claimed in claim 1, in which said gum ghatti is present in an amount from about .3 to .5 percent of said emulsion.

5. An oil-in-water emulsion as claimed in claim 1, said emulsion further including a flavoring ingredient.

6. An oil-in-water emulsion as claimed in claim 1, said emulsion further including an edible acid and edible buffer salt in amounts sufficient to bring the pH of said emulsion to a range of about 4.5 to 5.5.

7. An oil-in-water emulsion as claimed in claim 6, in which the pH of the emulsion is about 4.9 to 5.1.

8. An edible, stable, pourable, oil-in-water emulsion suitable for use as a table syrup, comprising an aqueous phase containing about 65 to 70 percent sugar solids, an oil phase containing about 1 to 5 percent butter by weight of said emulsion, lecithin in an amount of about .06 to .09 percent of said emulsion, and gum ghatti in an amount of about .3 to .5 percent of said emulsion.

9. An oil-in-water emulsion as claimed in claim 7, in which said gum ghatti is present in about 0.4 percent of said emulsion.

10. An edible, stable, pourable oil-in-water emulsion suitable for use as a table syrup, comprising an aqueous phase containing at least about 65 percent sugar solids, an oil phase containing edible oil in an amount of about 1 to 40 percent by weight of said emulsion, lecithin in an amount of about .02 to .5 percent of said emulsion, and gum ghatti in an amount of about .1 to 1.0 percent of said emulsion, said aqueous and oil phases being emulsified whereby the oil globules in the emulsion do not exceed 3 microns in diameter.

11. A method of forming an edible, stable, pourable, oil-in-water emulsion suitable for use as a table syrup, comprising blending an aqueous solution containing at least about 65 percent sugar, an oil in an amount of about 1 to 40 percent by weight of said emulsion, gum ghatti in an amount from about .1 to 1.0 percent of said emulsion, and lecithin in an amount from about 0.02 to .5 percent of said emulsion, and homogenizing the blended materials to form a stable emulsion.

12. A method of forming an oil-in-water emulsion as claimed in claim 10, in which homogenization of the emulsion is carried out at an emulsion temperature of about 140° to 150° F.

13. A method of forming an edible, stable, pourable, oil-in-water emulsion suitable for use as table syrup, comprising melting butter in an amount equal to about 1 to 40 percent of said emulsion and dispersing the melted butter in a sugar syrup, dispersing gum ghatti in an amount equal to about .1 to 1.0 percent of said emulsion in another sugar solution, heating the butter-sugar solution to a temperature of about 140° to 200° F. and the gum ghatti sugar solution to about 140° to 200° F., blending the solutions with each other and with about 0.02 to 0.5 percent lecithin per weight of said emulsion, and homogenizing the blended solutions to a stable emulsion while maintaining the temperature of the solutions at about 140° to 180° F. during homogenization.

14. A method of forming an edible, stable, pourable, oil-in-water emulsion suitable for use as table syrup, comprising melting butter in an amount equal to about 1 to 5 percent of said emulsion and dispersing the butter in a sugar syrup together with about 0.20 to 50 percent lecithin per weight of butter, heating the butter-lecithin-sugar syrup to a temperature of about 170° F., dispersing gum ghatti in forming a third syrup by blending a sugar syrup with maple flavor, an edible acid and a buffer salt of said acid, said acid and said buffer salt being present in amounts sufficient to bring the pH of the resulting emulsion to about 4.5 to 5.5, blending the three syrups together, and homogenizing the resulting syrup to a stable emulsion at a temperature of about 170° F.

References Cited by the Examiner
UNITED STATES PATENTS

| 2,646,354 | 7/1953 | Wachtel et al. | 99—123 |
| 3,057,734 | 10/1962 | Pader | 99—142 |

OTHER REFERENCES

Whistler et al., Industrial Gums, New York, Academic Press, 1959, pp. 311, 314, and 318.

A. LOUIS MONACELL, *Primary Examiner.*

S. E. HEYMAN, *Assistant Examiner.*